United States Patent
Kim et al.

(10) Patent No.: US 10,066,527 B2
(45) Date of Patent: Sep. 4, 2018

(54) COOLING DEVICE FOR REDUCING AGENT INJECTION MODULE AND SELECTIVE CATALYTIC REDUCTION SYSTEM HAVING THE SAME

(71) Applicant: DOOSAN INFRACORE CO., LTD., Incheon (KR)

(72) Inventors: Eun-Hyoung Kim, Incheon (KR); Nam-Il Choi, Incheon (KR)

(73) Assignee: DOOSAN INFRACORE CO., LTD., Incheon (KR)

( * ) Notice: Subject to any disclaimer, the term of this patent is extended or adjusted under 35 U.S.C. 154(b) by 62 days.

(21) Appl. No.: 15/120,644

(22) PCT Filed: Nov. 6, 2014

(86) PCT No.: PCT/KR2014/010628
§ 371 (c)(1),
(2) Date: Aug. 22, 2016

(87) PCT Pub. No.: WO2015/126034
PCT Pub. Date: Aug. 27, 2015

(65) Prior Publication Data
US 2017/0016372 A1  Jan. 19, 2017

(30) Foreign Application Priority Data
Feb. 21, 2014 (KR) .................. 10-2014-0020640

(51) Int. Cl.
| | |
|---|---|
| F01N 3/24 | (2006.01) |
| F01N 3/20 | (2006.01) |
| B01D 53/94 | (2006.01) |
| F01P 5/10 | (2006.01) |
| F28D 15/02 | (2006.01) |

(52) U.S. Cl.
CPC ....... F01N 3/2066 (2013.01); B01D 53/9418 (2013.01); F01N 3/208 (2013.01);
(Continued)

(58) Field of Classification Search
CPC .......... F01N 2260/02; F01N 2260/022; F01N 2260/024; F01N 2610/10; F01N 2610/11
See application file for complete search history.

(56) References Cited

U.S. PATENT DOCUMENTS

| | | |
|---|---|---|
| 8,695,542 B2 | 4/2014 | Vacca et al. |
| 2010/0242439 A1 | 9/2010 | Domon et al. |

(Continued)

FOREIGN PATENT DOCUMENTS

| | | |
|---|---|---|
| CN | 101680352 A | 3/2010 |
| DE | 102009008743 A1 | 8/2010 |

(Continued)

OTHER PUBLICATIONS

European Search Report dated Jul. 14, 2017, corresponding to European Publication No. 14882978.1.

(Continued)

*Primary Examiner* — Jonathan Matthias
(74) *Attorney, Agent, or Firm* — Hauptman Ham, LLP (57) ABSTRACT

A cooling device for a reducing agent injection module includes a coolant circulation line connected to a module cooling channel for cooling the reducing agent injection module and configured that a coolant circulates therethrough, a closed circuit circulation line respectively connected to a first portion of the coolant circulation line in front of the module cooling channel and to a second portion of the coolant circulation line in rear of the module cooling channel and configured that a portion of the coolant circulation line is selectively used to form a closed circuit, and at least one heat dissipating part provided in the closed circuit to dissipate heat which is transported from the module cooling channel by natural convection of the coolant within the closed circuit.

12 Claims, 5 Drawing Sheets

(52) U.S. Cl.
CPC ............... *F01P 5/10* (2013.01); *F28D 15/02* (2013.01); *F01N 2610/11* (2013.01); *F01N 2610/1453* (2013.01); *Y02T 10/24* (2013.01)

(56) References Cited

U.S. PATENT DOCUMENTS

| | | |
|---|---|---|
| 2011/0243818 A1 | 10/2011 | Frederiksen |
| 2013/0081377 A1 | 4/2013 | Burger |

FOREIGN PATENT DOCUMENTS

| | | |
|---|---|---|
| DE | 102010030343 A1 | 12/2011 |
| JP | 2006-226162 A | 8/2006 |
| JP | 2009-013845 A | 1/2009 |
| JP | 2009-228616 A | 10/2009 |
| JP | 2010-121548 A | 6/2010 |
| JP | 2011-080397 A | 4/2011 |
| KR | 10-2010-0057781 A | 6/2010 |
| KR | 10-2013-014235 A | 2/2013 |

OTHER PUBLICATIONS

Korean Office Action dated Sep. 1, 2017 from KIPO in connection with the counterpart Korean Patent Application No. 10-2016-7021126.
International Search Report dated Jan. 23, 2015 for PCT/KR2014/010628.
Chinese Office Action dated Jan. 31, 2018 for corresponding Chinese Application No. 201480076118.0.

COOLING DEVICE FOR REDUCING AGENT INJECTION MODULE AND SELECTIVE CATALYTIC REDUCTION SYSTEM HAVING THE SAME

CROSS REFERENCE TO RELATED APPLICATION

This application claims the priority of Korean Patent Application No. 10-2014-0020640, filed Feb. 21, 2014 in the Korean Intellectual Property Office. Further, this application is the National Phase application of International Application No. PCT/KR2014/010628, filed Nov. 6, 2014, which designates the United States and was published in Korean.

BACKGROUND

1. Field

Example embodiments relate to a cooling device for a reducing agent injection module and a selective catalytic reduction system having the same. More particularly, example embodiments relate to a device of cooling a reducing agent injection module for performing an exhaust gas after-treatment of an engine and a selective catalytic reduction system having the same.

2. Description of the Related Art

A selective catalytic reduction device may be used as an exhaust gas after-treatment device for reducing pollutants in an exhaust gas of an engine. The selective catalytic reduction device may include a reducing agent injection module for injecting a reducing agent in a flow direction of the exhaust gas. An engine coolant may circulate through a coolant circulation line connected to the reducing agent injection module to prevent the reducing agent injection module from being heated by the exhaust gas of high temperature.

However, as the engine stops, the coolant pump may stop to operate so that the flow of the coolant through the coolant circulation line is stopped. In this time, the reducing agent injection module may continue to be heated by an exhaust pipe of high temperature, and thus, the reducing agent injection module may be deformed due to the heat or a nozzle of the reducing agent injection module may be blocked by a solid material vaporized from urea.

SUMMARY

Example embodiments provide a cooling device for reducing agent injection module having an enhanced cooling configuration with low cost.

Example embodiments provide a selective catalytic reduction system including the cooling device.

According to example embodiments, a cooling device for a reducing agent injection module includes a coolant circulation line connected to a module cooling channel for cooling the reducing agent injection module and configured that a coolant circulates therethrough, a closed circuit circulation line respectively connected to a first portion of the coolant circulation line in front of the module cooling channel and to a second portion of the coolant circulation line in rear of the module cooling channel and configured that a portion of the coolant circulation line is selectively used to form a closed circuit, and at least one heat dissipating part provided in the closed circuit to dissipate heat which is transported from the module cooling channel by natural convection of the coolant within the closed circuit.

In example embodiments, the cooling device may further include a closed circuit control valve provided in the closed circuit circulation line and configured to control a flow direction of the coolant.

In example embodiments, the reducing agent injection module may be installed at a position lower than the heat dissipating part in a vertical direction such that the coolant undergoes natural convection along the closed circuit line.

In example embodiments, the closed circuit control valve may be operable to open the closed circuit circulation line when a coolant pump for supplying the coolant stops.

In example embodiments, the coolant circulation line may include a coolant supply line connected to an input portion of the module cooling channel and a coolant recovery line connected to an output portion of the module cooling channel.

In example embodiments, the heat dissipating part may include a first heat dissipating part disposed in the coolant supply line and a second heat dissipating part disposed in the coolant recovery line.

In example embodiments, the heat dissipating part may include a heat pipe or a heat reservoir.

In example embodiments, the reducing agent injection module may be installed in an exhaust pipe to inject a reducing agent into the exhaust pipe.

In example embodiments, a selective reduction catalyst may be installed in the exhaust pipe and the reducing agent injection module is installed in front of the selective reduction catalyst.

According to example embodiments, a selective catalytic reduction system includes a reducing agent injection module installed in an exhaust pipe through which an exhaust gas from an engine is exhausted and configured to inject a reducing agent into the exhaust pipe in order to reduce nitrogen oxide (NOx) in the exhaust gas, a coolant circulation line connected to a module cooling channel for cooling the reducing agent injection module, a coolant pump installed in the coolant circulation line to supply a coolant to the module cooling channel, a closed circuit circulation line respectively connected to a first portion of the coolant circulation line in front of the module cooling channel and to a second portion of the coolant circulation line in rear of the module cooling channel and configured to provide a closed circuit having the module cooling channel, and at least one heat dissipating part provided in the closed circuit to dissipate heat which is transported from the module cooling channel by natural convection of the coolant within the closed circuit.

In example embodiments, the selective catalytic reduction system may further include a closed circuit control valve connecting the closed circuit circulation line to the coolant circulation line and configured to control a flow direction of the coolant.

In example embodiments, the closed circuit control valve may be operable to open the closed circuit circulation line when the coolant pump stops, such that the coolant undergoes natural convection along the closed circuit line.

In example embodiments, the heat dissipating part may include a first heat dissipating part disposed in a coolant supply line of the coolant circulation line and a second heat dissipating part disposed in the coolant recovery line of the coolant circulation line.

In example embodiments, the heat dissipating part may include a heat pipe or a heat reservoir.

In example embodiments, the selective catalytic reduction system may further a selective reduction catalyst installed in the exhaust pipe in rear of the reducing agent injection module.

According to example embodiments, when a coolant pump operates, a coolant may be circulated through a coolant circulation line to cool a reducing agent injection module, while when the coolant pump stops, a closed circuit independently separated from a coolant circulation line may be formed, and then the coolant may undergo natural convection through the closed circuit to cool the reducing agent injection module.

Accordingly, in order to cool the reducing agent injection module after the engine stops, instead of extra expensive equipment such as an electric pump, a simple closed circuit may be formed to provide natural convection circuit, thereby cooling the reducing agent injection module. Thus, cost savings may be achieved and a space for equipment in an engine system may be increased.

BRIEF DESCRIPTION OF THE DRAWINGS

Example embodiments will be more clearly understood from the following detailed description taken in conjunction with the accompanying drawings. FIGS. 1 to 5 represent non-limiting, example embodiments as described herein.

DETAILED DESCRIPTION OF EXAMPLE EMBODIMENTS

Various example embodiments will be described more fully hereinafter with reference to the accompanying drawings, in which example embodiments are shown. Example embodiments may, however, be embodied in many different forms and should not be construed as limited to example embodiments set forth herein. Rather, these example embodiments are provided so that this disclosure will be thorough and complete, and will fully convey the scope of example embodiments to those skilled in the art. In the drawings, the sizes and relative sizes of components or elements may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element or layer is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments will be explained in detail with reference to the accompanying drawings.

Figure 1:
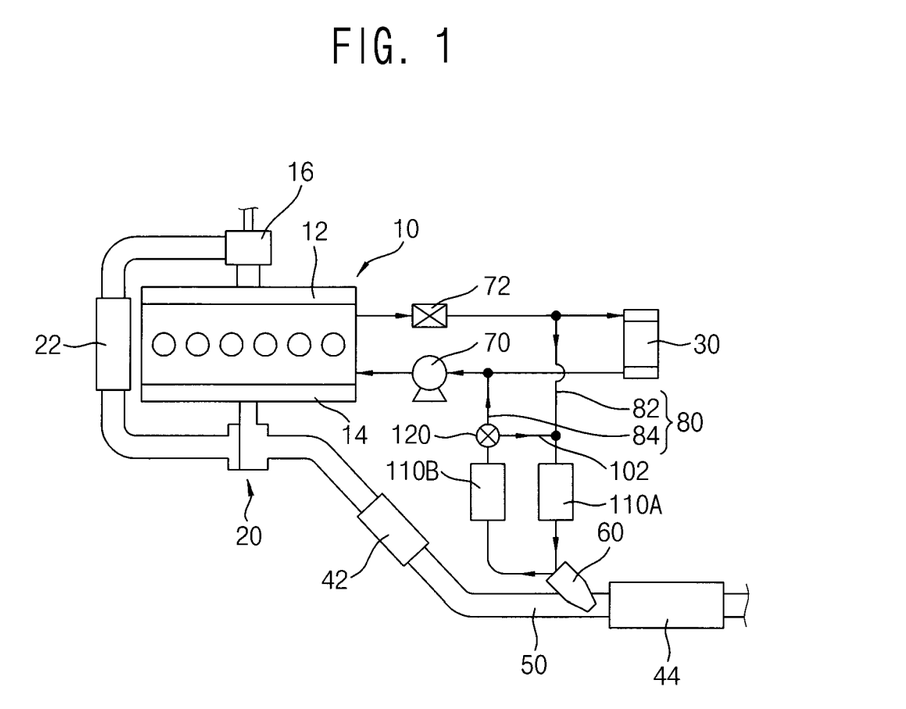
FIG. 1 is a view illustrating a selective catalytic reduction system in accordance with example embodiments.
Figure 2:
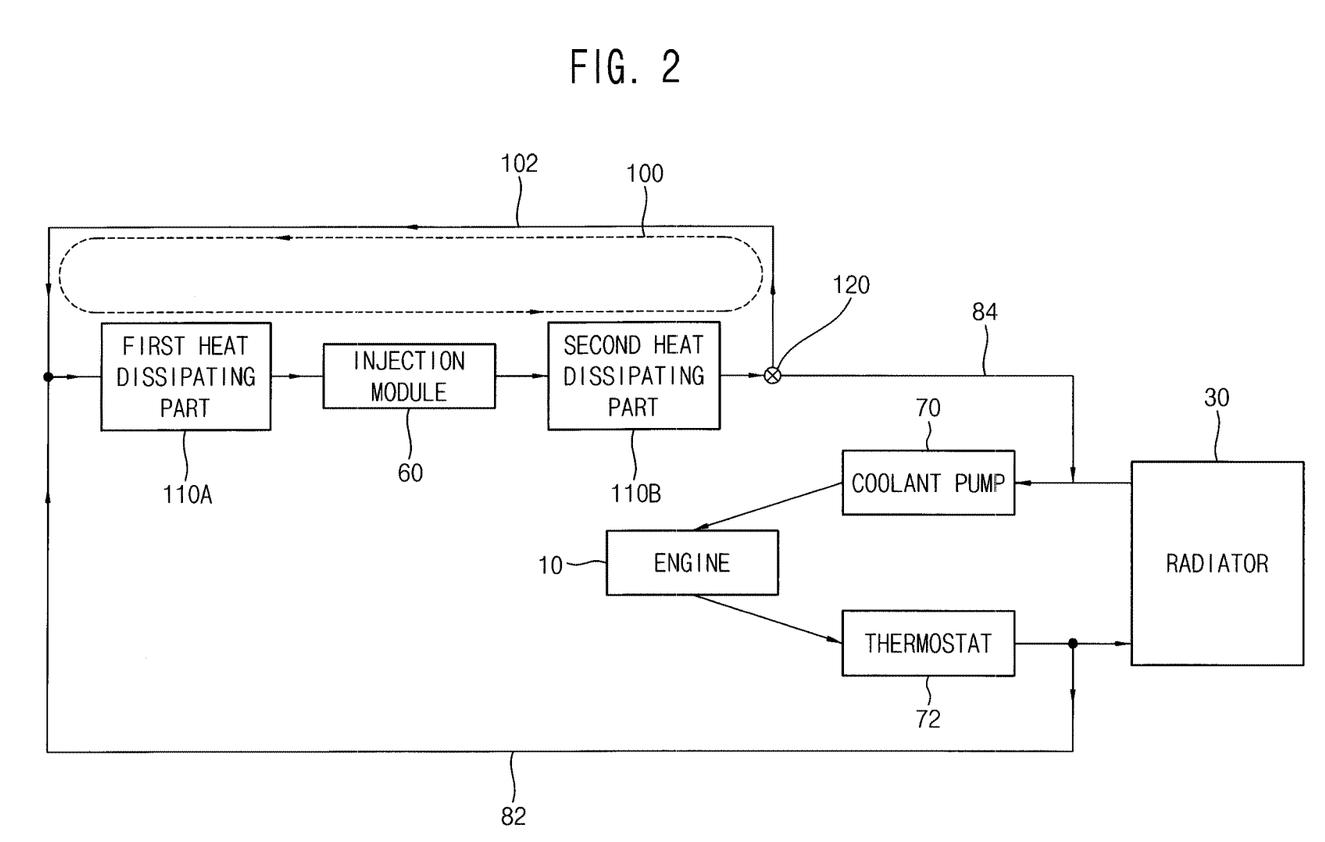
FIG. 2 is a block diagram illustrating the selective catalytic reduction system in FIG. 1.
Figure 3:
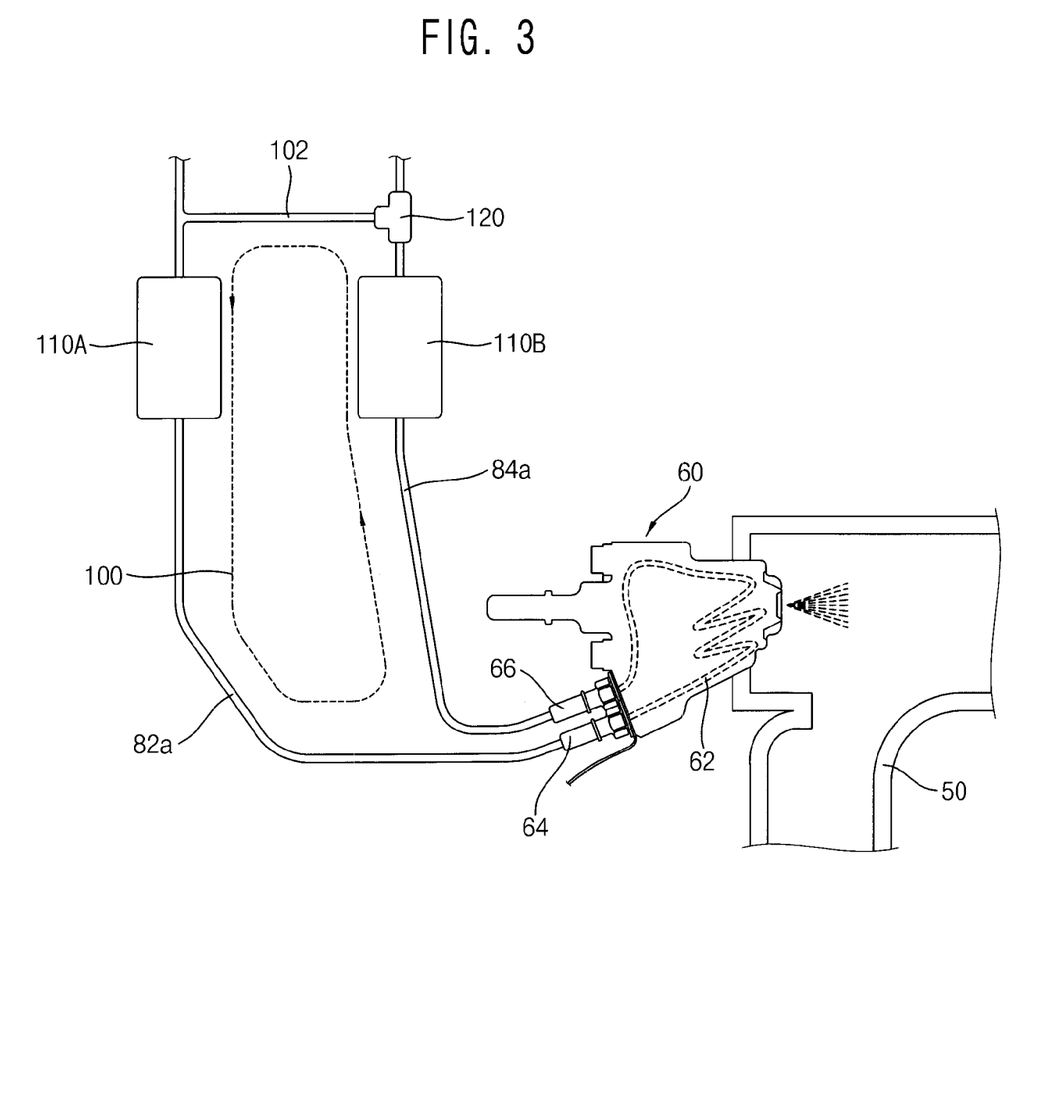
FIG. 3 is a cross-sectional view illustrating a cooling device for reducing agent injection module in FIG. 1.
Figure 4A:
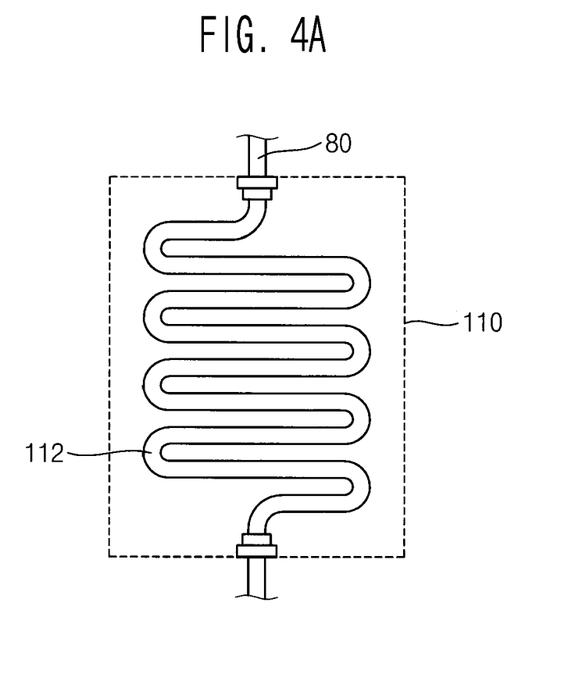
FIGS. 4A and 4B are views illustrating various structures of a heat dissipating part of the cooling device in FIG. 3.
Figure 4B:
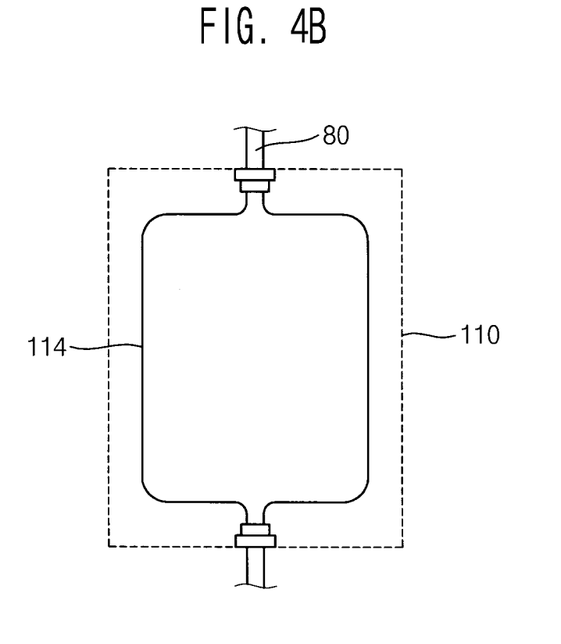

FIG. 1 is a view illustrating a selective catalytic reduction system in accordance with example embodiments. FIG. 2 is a block diagram illustrating the selective catalytic reduction system in FIG. 1. FIG. 3 is a cross-sectional view illustrating a cooling device for reducing agent injection module in FIG. 1. FIGS. 4A and 4B are views illustrating various structures of a heat dissipating part of the cooling device in FIG. 3.

Referring to FIGS. 1 to 4B, a selective catalytic reduction system may include a selective catalytic reduction (SCR) device having a reducing agent injection module 60 for injecting a reducing agent into an exhaust gas in order to reduce NOx emissions from an engine 10, and a cooling device for cooling the reducing agent injection module 60.

In example embodiments, the SCR device may include a selective reduction catalyst 44 installed in an exhaust pipe 50 and the reducing agent injection module 60 for injecting the reducing agent into the exhaust pipe 50 in a front side of the selective reduction catalyst 44. Additionally, a diesel oxidation catalyst (DOC) device 42 may be provided in front of the SCR device in the exhaust pipe 50.

The reducing agent injection module 60 may spray out a reducing agent such as urea to reduce nitrogen oxide (NOx)

in the exhaust gas exhausted from the engine 10. Because the temperature of the exhaust gas from the engine 10 ranges as high as several hundreds of degrees (° C.), the reducing agent may be injected into the exhaust pipe 50 and then be vaporized immediately. The vaporized reducing agent may be mixed with the exhaust gas, and the nitrogen oxide may react with the reducing agent adsorbed on the selective reduction catalyst 44 such that the nitrogen oxide is reduced into a nitrogen gas and water.

In example embodiments, the cooling device for the reducing agent injection module may a coolant circulation line 80 connected to a module cooling channel 62 of the reducing agent injection module 60, a coolant pump 70 installed in the coolant circulation line 80 to supply a coolant to the module cooling channel 62, a closed circuit circulation line 102 connected to the coolant circulation line 80 to provide a closed circuit 100 having the module cooling channel 62 as a portion of the closed circuit 100, and at least one heat dissipating part 110 provided in the closed circuit 100 to dissipate heat which is transported from the module cooling channel 62 by natural convection of the coolant within the closed circuit 100.

The coolant circulation line 80 may include a coolant supply line 82 for connecting the coolant pump 70 to an input portion 64 of the module cooling channel 62 of the reducing agent injection module 60 and a coolant recovery line 84 for connecting the coolant pump 70 to an output portion 66 of the module cooling channel 62.

The closed circuit circulation line 102 may be connected to a first portion of the coolant circulation line 80 in front of (for example, in the upstream of) the module cooling channel 62 and may be connected to a second portion of the coolant circulation line 80 in rear of (for example, in the downstream of) the module cooling channel 62. In particular, a first end portion of the closed circuit circulation line 102 may be connected to the coolant supply line 82 and a second end portion of the closed circuit circulation line 102 opposite to the first end portion may be connected to the coolant recovery line 84 to constitute the closed circuit 100. For example, the coolant circulation line 80 and the closed circuit circulation line 102 may include a hose, a pipe, etc.

The heat dissipating part 110 may include a first heat dissipating part 110A disposed in the coolant supply line 82 and a second heat dissipating part 110B disposed in the coolant recovery line 84. The first heat dissipating part 110A may be disposed in a portion 82a of the coolant supply line 82 and the second heat dissipating part 110B may be disposed in a portion 84a of the coolant recovery line 84 such that the first and second heat dissipating parts 110A and 110b may dissipate heat which is transported from the reducing agent injection module 60. A third heat dissipating part (not illustrated) may be additionally provided in the closed circuit circulation line 102.

Alternatively, one heat dissipating part may be disposed in any one of the coolant supply line 82 and the coolant recovery line 84, or may be disposed only in the closed circuit circulation line 102.

As illustrated in FIG. 3, the closed circuit 100 may include the module cooling channel 62 of the reducing agent injection module 60, the portion 84a of the coolant recovery line 84, the closed circuit circulation line 102 and the portion 82a of the coolant supply line 82.

The closed circuit 100 having the module cooling channel 62 of the reducing agent injection module 60 may be a closed circuit independently separated from the coolant circulation line 80. A sealed space of the closed circuit 100 may be filled with a coolant. The coolant may be a fluid having excellent heat transfer characteristics.

In example embodiments, the cooling device for the reducing agent injection module may further include a closed circuit control valve 120 configured to connect the closed circuit circulation line 102 to the coolant circulation line 80 and control a flow direction of the coolant. The second end portion of the closed circuit circulation line 102 may be connected to the coolant recovery line 84 by the closed circuit control valve 120. For example, the closed circuit control valve 120 may include a three-way control valve.

When the coolant pump 70 operates, the closed circuit control valve 120 may close the closed circuit circulation line 102 to circulate the coolant through the coolant circulation line 80. When the coolant pump 70 stops, the closed circuit control valve 120 may open the closed circuit circulation line 102 such that the coolant may flow under natural convection through the closed circuit 100.

For example, when the coolant pump 70 stops, the flow of the coolant through the coolant circulation line 80 is stopped. In this case, the closed circuit circulation 102 may be opened by the closed circuit control valve 120 to form the closed circuit 100. The reducing agent injection module 60 may be heated continuously by the exhaust pipe 50 of high temperature, and heat from the module cooling channel 62 in the reducing agent injection module 60 may be transported to the first and second heat dissipating parts 110A and 100B by natural convection of the coolant within the closed circuit 100 and then may be dissipated to a surrounding environment by the first and second heat dissipating parts 110A and 100B. Accordingly, while the coolant pump 70 stops, the reducing agent injection module 60 may be cooled by natural convention within the closed circuit 100.

In example embodiments, a check valve (not illustrated) may be additionally provided in the closed circuit 100 to provide a flow direction of the coolant within the closed circuit 100. That is, the coolant within the closed circuit 100 may flow in one direction by the check valve. Further, a pressuring part (not illustrated) may be additionally provided in the closed circuit 100 to increase a pressure in the sealed space of the closed circuit 100.

As illustrated in FIG. 1, the cooling device for the reducing agent injection module may cool the reducing agent injection module 60 as well as the engine 10 and a turbocharger (not illustrated) using one coolant pump 70. Alternatively, the cooling device may cool only the reducing agent injection module 60, and an additional coolant pump may cool the engine, the turbocharger, etc.

As illustrated in FIGS. 4A and 4B, the heat dissipating part may include various cooling structures. As illustrated in FIG. 4A, the heat dissipating part may include a heat pipe 112. The heat pipe 112 may extend in a zigzag shape. The heat pipe 112 may include a metal or synthetic resin having excellent heat transfer characteristics. As illustrated in FIG. 4B, the heat dissipating part may include a heat reservoir. A material, heat capacity, cooling performance of the heat pipe and the heat reservoir may be determined in consideration of a heat temperature, operating temperature range, etc of the reducing agent injection module 60.

Hereinafter, an operation of the selective catalytic reduction system will be explained.

Figure 5:
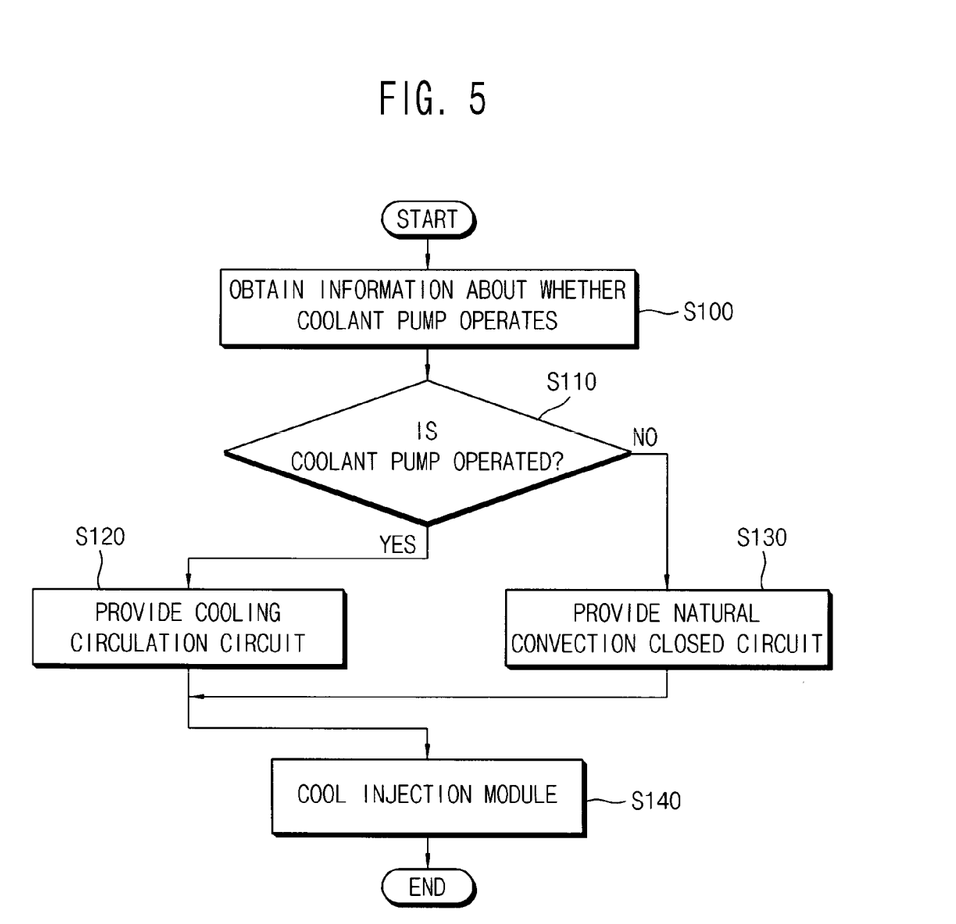
FIG. 5 is a flow chart illustrating a cooling control method of a reducing agent injection module in the selective catalytic reduction system of FIG. 1.

FIG. 5 is a flow chart illustrating a cooling control method of a reducing agent injection module in the selective catalytic reduction system of FIG. 1.

Referring to FIGS. 1 to 5, a fuel gas may be injected into an engine 10 and the engine 10 may operate, and an exhaust gas from the engine 10 may be exhausted through an exhaust gas after-treatment device.

First, the fuel gas may be supplied by a fuel supply, may be mixed with an air, which is supplied through a turbocharger 20, in a mixer 16, and then, may be supplied to an intake manifold 12 of the engine 10. In here, the air supplied through the turbocharger 20 may be cooled by an intercooler 22. On the other hand, the exhaust gas exhausted from an exhaust manifold 14 of the engine 10 may flow through the turbocharger 20 and may be exhausted to a surrounding environment via an exhaust pipe 50.

The exhaust gas passing though the turbocharger 20 may be exhausted to the surrounding environment via a diesel oxidation catalyst (DOC) device 42 and a selective reduction catalyst 44. A reducing agent injection module 60 may inject a reducing agent into the exhaust pipe 50 in front of the selective reduction catalyst 44. Because the temperature of the exhaust gas from the engine 10 ranges as high as several hundreds of degrees (° C.), the reducing agent injected into the exhaust pipe 50 may be vaporized immediately. The vaporized reducing agent may be mixed with the exhaust gas, and nitrogen oxide may react with the reducing agent adsorbed on the selective reduction catalyst 44 such that the nitrogen oxide is reduced into a nitrogen gas and water.

A cooling device for the reducing agent injection module may circulate a coolant through a coolant circulation line 80 to prevent the reducing agent injection module 60 from being overheated by the exhaust gas of high temperature.

In example embodiments, information about whether a coolant pump 70 operates, such as an operation of the engine 10, may be obtained (S100), and an operation of a closed circuit control valve 120 may be determined based on a result of whether the coolant pump 70 operates (S110). The coolant pump 70 may be connected to the engine 10. As the engine 10 operates, the coolant pump 70 may operate. When the engine 10 stops, the coolant pump 70 may stop.

When the engine 10 starts, the coolant pump 70 may start to operate and circulate a coolant through the coolant circulation line 80. A controller (not illustrated) may control the operation of the closed circuit control valve 120, and the closed circuit control valve 120 may open a coolant recovery line 84 to provide a cooling circulation circuit (S120). In here, a closed circuit circulation line 102 may be closed by the closed circuit control valve 120. Accordingly, the coolant may circulate through the coolant circulation line 80 to cool the reducing agent injection module 60 (S140).

On the other hand, when the engine 10 stops immediately after load operation, the coolant pump 70 may stop to operate so that the flow of the coolant through the coolant circulation line 80 is stopped. In here, the closed circuit control valve 120 may open the closed circuit circulation line 102 to provide a natural convection closed circuit 100 (S130). In here, the coolant recovery line 84 may be closed by the closed circuit control valve 120. Accordingly, the coolant may circulate through the natural convection closed circuit 100 to cool the reducing agent injection module 60 (S140).

For example, after the coolant pump 70 stops, the temperature of the reducing agent injection module 60 may continue to increase. In case that the closed circuit circulation line 102 is not opened, the temperature of the reducing agent injection module 60 may rise up to about 150° C. When the closed circuit circulation line 102 is opened by the closed circuit control valve 120 to form the closed circuit 100, heat from the reducing agent injection module 60 may be transported to first and second heat dissipating parts 110A and 100B by natural convection of the coolant within the closed circuit 100 and then may be dissipated to a surrounding environment by the first and second heat dissipating parts 110A and 100B. In case that the first and second heat dissipating parts include a heat pipe having a zigzag shape, the reducing agent injection module 60 may be cooled and maintained under a temperature of about 110° C.

As mentioned above, when the coolant pump 70 operates, the coolant may be circulated through the coolant circulation line 80 to cool the reducing agent injection module 60, while when the coolant pump 70 stops, the closed circuit 100 independently separated from the coolant circulation line 80 may be formed, and then the coolant may undergo natural convection through the closed circuit 100 to cool the reducing agent injection module 60.

The natural convection of the coolant may be more likely or more rapid when a heat source such as the reducing agent injection module 60 is installed at a position lower than the heat dissipating part in a vertical direction. As the coolant is heated by the heat source, the coolant may be vaporized and density of the coolant may be decreased. The coolant having a relatively lower density may rise up toward the heat dissipating part at a relatively higher position along the closed circuit circulation line to be cooled, while the coolant having a relatively higher density may fall down toward the reducing agent injection module 60 at a relatively lower position, and thus the coolant may circulate through the closed circuit circulation line. The natural convection may continue until the cooling of the reducing agent injection module 60 is completed.

Accordingly, in order to cool the reducing agent injection module 60 after the engine 10 stops, instead of extra expensive equipment such as an electric pump, a simple closed circuit may be formed to provide natural convection circuit, thereby cooling the reducing agent injection module 60. Thus, cost savings may be achieved and a space for equipment in an engine system may be increased.

The foregoing is illustrative of example embodiments and is not to be construed as limiting thereof. Although a few example embodiments have been described, those skilled in the art will readily appreciate that many modifications are possible in example embodiments without materially departing from the novel teachings and advantages of the present invention. Accordingly, all such modifications are intended to be included within the scope of example embodiments as defined in the claims.

What is claimed is:

1. A cooling device for a reducing agent injection module, the cooling device comprising:
   a coolant circulation line connected to a module cooling channel for cooling the reducing agent injection module and configured that coolant circulates therethrough;
   a closed circuit circulation line respectively connected to a first portion of the coolant circulation line in upstream of the module cooling channel and to a second portion of the coolant circulation line in downstream of the module cooling channel and configured that a portion of the coolant circulation line is selectively used to form a closed circuit;
   at least one heat dissipating part provided in the closed circuit to dissipate heat which is transported from the module cooling channel by natural convection of the coolant within the closed circuit;
   a closed circuit control valve provided in the closed circuit circulation line and configured to control a flow direction of the coolant; and a coolant pump provided in the coolant circulation line outside the closed circuit circulation line and configured to supply the coolant, wherein the closed circuit control valve is operable to open the closed circuit circulation line when the coolant pump stops.

2. The cooling device of claim 1, wherein the reducing agent injection module is installed at a position lower than the heat dissipating part in a vertical direction such that the coolant undergoes natural convection along the closed circuit line.

3. The cooling device of claim 1, wherein the coolant circulation line comprises a coolant supply line connected to an input portion of the module cooling channel and a coolant recovery line connected to an output portion of the module cooling channel.

4. The cooling device of claim 3, wherein the heat dissipating part comprises a first heat dissipating part disposed in the coolant supply line and a second heat dissipating part disposed in the coolant recovery line.

5. The cooling device of claim 1, wherein the heat dissipating part comprises a heat pipe or a heat reservoir.

6. The cooling device of claim 1, wherein the reducing agent injection module is installed in an exhaust pipe to inject a reducing agent into the exhaust pipe.

7. The cooling device of claim 6, wherein a selective reduction catalyst is installed in the exhaust pipe and the reducing agent injection module is installed in front of the selective reduction catalyst.

8. A cooling device for a reducing agent injection module, the cooling device comprising:
a coolant circulation line connected to a module cooling channel for cooling the reducing agent injection module and configured that coolant circulates therethrough;
a closed circuit circulation line respectively connected to a first portion of the coolant circulation line in upstream of the module cooling channel and to a second portion of the coolant circulation line in downstream of the module cooling channel and configured that a portion of the coolant circulation line is selectively used to form a closed circuit;
a closed circuit control valve provided in the closed circuit circulation line and configured to control a flow direction of the coolant; and
a coolant pump provided in the coolant circulation line outside the closed circuit circulation line to supply the coolant, wherein when the coolant pump stops, the closed circuit control valve is operable to open the closed circuit circulation line such that heat transported from the module cooling channel is dissipated by natural convection of the coolant within the closed circuit.

9. The cooling device of claim 8, further comprising at least one heat dissipating part provided in the closed circuit to dissipate the heat which is transported from the module cooling channel, and wherein the heat dissipating part comprises a heat pipe or a heat reservoir.

10. The cooling device of claim 9, wherein the reducing agent injection module is installed at a position lower than the heat dissipating part in a vertical direction such that the coolant undergoes natural convection along the closed circuit line.

11. The cooling device of claim 8, wherein the reducing agent injection module is installed in a bottom position in a vertical direction of the closed circuit line such that the coolant undergoes natural convection along the closed circuit line.

12. The cooling device of claim 8, wherein the coolant circulation line comprises a coolant supply line connected to an input portion of the module cooling channel and a coolant recovery line connected to an output portion of the module cooling channel.

* * * * *